(12) United States Patent
Yurkovic (10) Patent No.: US 6,487,585 B1
(45) Date of Patent: Nov. 26, 2002

(54) SYSTEM AND METHOD FOR "OPEN MIKE" NETWORK-BASED COMMUNICATION (75) Inventor: Robert J. Yurkovic, Ringwood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/373,076

(22) Filed: Aug. 11, 1999

(51) Int. Cl.[7] ............................................... G06F 15/16
(52) U.S. Cl. ...................... 709/206; 709/201; 709/204; 709/207; 709/231; 709/224
(58) Field of Search ................. 709/206, 207, 709/204, 201, 217–219, 223–226, 227, 231, 237, 248, 249, 203; 370/352, 429

(56) References Cited

U.S. PATENT DOCUMENTS 5,920,546 A * 7/1999 Hebert et al. ............... 370/260
6,108,687 A * 8/2000 Craig ......................... 709/203
6,178,430 B1 * 1/2001 Cohen et al. ................ 707/501
6,239,793 B1 * 5/2001 Barnert et al. .............. 345/302
6,343,313 B1 * 1/2002 Salessky et al. ............ 709/204

* cited by examiner

*Primary Examiner*—Ario Etienne
(74) *Attorney, Agent, or Firm*—Harness, Dickey & Pierce, P.L.C.

(57) ABSTRACT

A computer implemented system and method administrates network-based conferencing, thereby enabling users to schedule, moderate, and attend network-based conferences, without manual system administration. In one implementation, a media provider system includes a web front end which administrates scheduling of network-based presentation events, delivers interactive display screens for receiving presentation data and control commands from a moderator, and controls media pushes and streaming during the presentation event. The web front end sends Email invitations and event reminders to attendees, including a password if access to the presentation event is closed. In one implementation, the web front end receives digital audio or video data from the moderator during the presentation event, which is streamed and transmitted to attendees.

29 Claims, 11 Drawing Sheets

SYSTEM AND METHOD FOR "OPEN MIKE" NETWORK-BASED COMMUNICATION

BACKGROUND OF THE INVENTION

1. Field of the Invention

The present invention relates to computer network technology, and more particularly to computer network-based communications.

2. Description of Related Art

Computer networks, particularly the Internet and World Wide Web, are increasingly relied on to deliver a wide variety of information-types, including text, graphics, audio, and video. In addition to creating web sites which are accessed by computer users equipped with web browser software to "pull" information, advertisers are increasingly using the Internet to "push" information by transmitting to a select group of users ("multicasting"). Using streaming media technology, web sites are also now able to transmit high-quality live and on-demand audio/video programming. To enable continuous playback of such programming, the receiving terminal must collect and buffer transmitted data packets, and send the buffered data packets to the application which converts the data to sound and/or pictures. Thus, current web browsers typically include audio/video "players" for processing received audio and/or video data packets as a steady and continuous stream so that the user can begin viewing and/or hearing programming before the entire file is transmitted, thus making computer network-based video and audio programming practical.

One well known format for streaming audio data over the World Wide Web is "RealAudio", developed by RealNetworks, Inc. RealNetworks has also developed "RealVideo" for streaming video data. To listen to/view a web page which includes "RealAudio" or "RealVideo" files, a user generally needs "Real Player" software, which has been included as a standard feature in common web browsers, such as "Internet Explorer" developed by Microsoft Corp.

Despite the emergence of streaming media technology, conventional network-based audio/video programming requires personnel to run live productions, modify access web pages, place support media on the web, and monitor studio production.

SUMMARY OF THE INVENTION

The present invention is a system and a method which controls scheduling, set-up, and execution of network-based presentations, without manual system administration. A network-based system controls event scheduling, preparation, media streaming, and media pushes. The system manages resources, such as available presentation time slots and media streams, as well as user interface displays.

In one embodiment, the present invention is a computer-based system configured to automatically administrate network-based conferences among users who are divided into two categories: moderators and attendees. A moderator, such as a business manager who needs to inform or train a group of people, schedules a presentation session via interactive web displays generated by a media provider system, provides pre-generated presentation materials, such as a digital slide presentation, to the media provider system, as well as live audio or video during the presentation. The moderator controls flow and termination of the presentation using an interactive control display screen generated by the media provider system.

Access to a scheduled presentation event may be public or limited to a group of invitees selected by the moderator. The media provider system sends out Email invitations to attendees, including a password if one has been assigned, and sends out reminders to both the moderator and attendees shortly before the designated time for the scheduled event. At the time of presentation, the media provider system generates an interactive control screen for display at the moderator, receives presentation control commands from the moderator, "pushes" previously stored presentation materials in accordance with input control commands, and transmits streamed audio or video to the attendees.

In another embodiment, the moderator and attendees exchange voice communication during a scheduled presentation via a two way phone bridge.

Advantageously, the present invention allows automated scheduling, preparation, media streaming, and media pushes, thereby offering a low cost solution to video/audio conferencing. The present invention may be implemented in an Internet environment, or as part of a businesses Intranet to create a forum for web-based training and conferences.

BRIEF DESCRIPTION OF THE DRAWINGS

Other aspects and advantages of the present invention will become apparent upon reading the following detailed description and upon reference to the drawings, in which.

DETAILED DESCRIPTION

The present invention is a computer-based system and method which administrates network-based conferencing, enabling users to schedule, moderate, and attend network-based conferences, without manual system administration.

Figure 1:
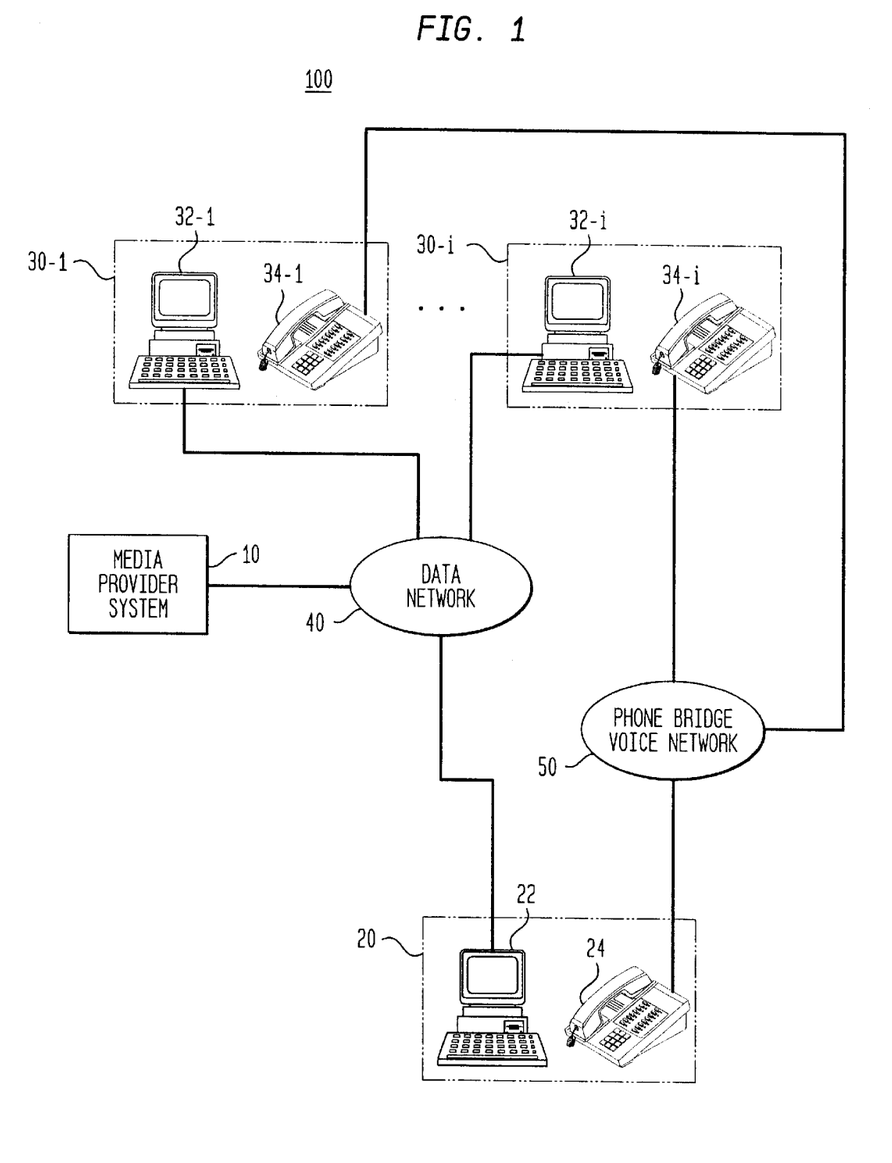
FIG. 1 illustrates an exemplary network configuration suitable for implementing embodiments of the present invention.

Referring to FIG. 1, there is shown a block diagram of an exemplary computer network configuration 100 suitable for implementing embodiments of the present invention. The network configuration 100 includes a media provider system 10; a moderator terminal 20; and a plurality of attendee terminals 30-1, ..., 30-i. The moderator terminal 20 and the attendee terminals 30-1, ... 30-i each include a computer terminal 22, 32-1, ... 32-i indirectly connected to the media service provider 10 via a data network 40. The data network may be the Internet or some other network-type, such as a wide area network (WAN) or local area network (LAN).

The moderator computer terminal 22 and the attendee computer terminals 32-1, ..., 32-i may be windows-based PCs having an Internet connection, for example through a direct Internet connection, a LAN, or through an Internet service provider. The moderator computer terminal 22 and the attendee computer terminals 32-1, ..., 32-i preferably include speakers and web-browser software, such as Microsoft's "Internet Explorer" or Netscape's "Navigator", having audio/video player software such as RealNetwork's "Real Player" for receiving media streams. The moderator computer terminal 22 also preferably includes a microphone for audio output/input, and a peripheral camera for video input.

As further illustrated in FIG. 1, the moderator terminal 20 and the attendee terminals 30-1, ... 30-i may each further include a telephone 24, 34-1, ... 34-i connected to a phone bridge voice network 50 to provide a telephone conference connection for two-way audio communication during a presentation event.

Figure 2:
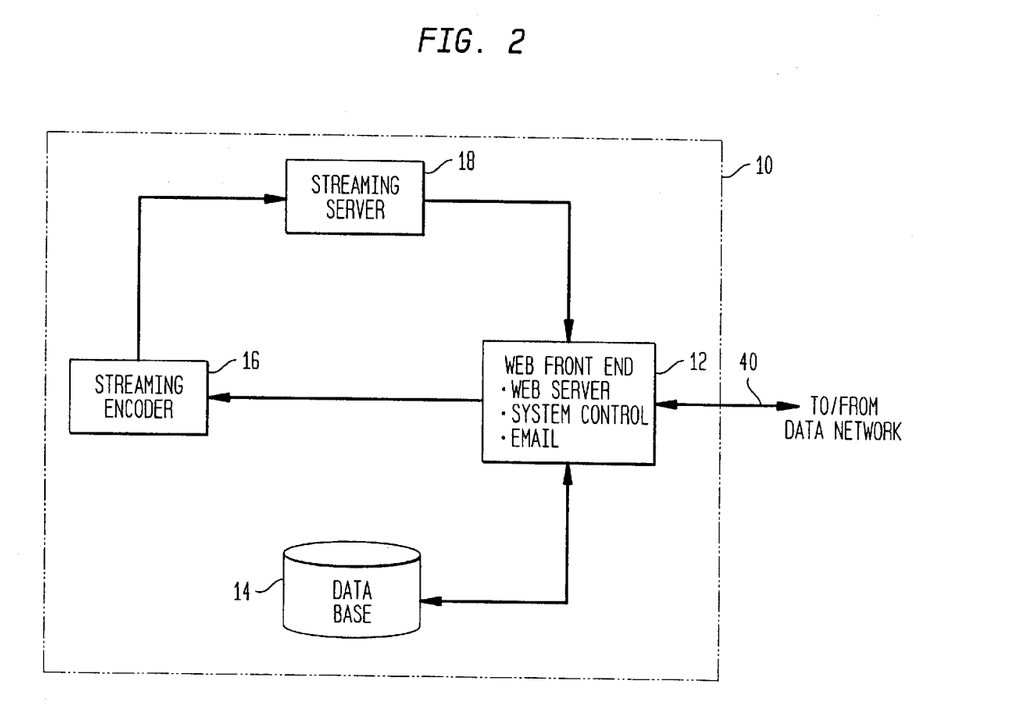
FIG. 2 is a block diagram of a media provider system for scheduling and controlling network-based presentations in accordance with an embodiment of the present invention.

FIG. 2 illustrates an exemplary configuration of the media provider system 10. As shown in FIG. 2, the media provider system 10 includes a web front end 12, a data base 14, a streaming encoder 16, and a streaming server 18. The web front end 12 functions as an interface between the media provider system 10 and the data network 40, and runs web server software to generate and deliver various web pages for display at the moderator and attendee computer terminals 22, 32-1, ... 32-i. As discussed in detail below, such web pages delivered by the web front end 12 include various input sections and graphical user interfaces (GUIs) which enable remote users to interactively schedule, setup, view, and moderate network-based presentation events via the media provider system 10. As discussed further below, the web front end 12 performs presentation event control functions, such as managing event schedules, storing presentation materials in the data base 14, sending Email notifications and reminders to event invitees, controlling audio/video encoding and streaming and media pushes, and controlling access to scheduled event presentations.

For ease of explanation, automated network-based conferencing according to one implementation of the present invention is described below with reference to four stages: (1) an event setup stage; (2) a preparation stage; (3) a pre-event stage; and (4) an event stage. These stages are discussed respectively with reference to the flow diagrams of FIGS. 3A–3D which show the sequence of processing steps occurring at the media provider system 10, the moderator 20, and the attendees 30, and further with reference to exemplary web pages illustrated in FIGS. 5, 6, 7, 8A, and 8B which are delivered by the web front end 12. The following discussion uses as an example a network-based presentation event which includes digital slides accompanied by live audio input by the moderator. It should be realized, however, that various presentation events are possible according to principles of the present invention.

Figure 3A:
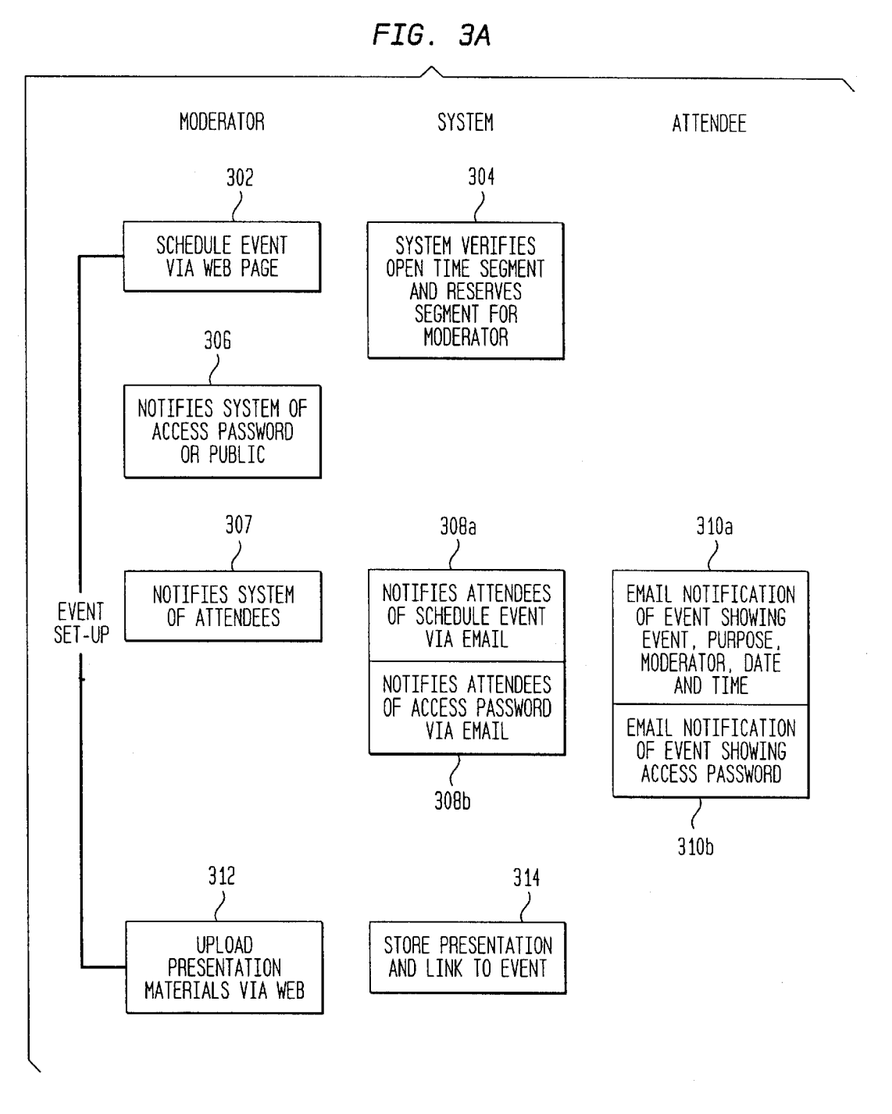
FIG. 3A is a flow diagram illustrating processing steps occurring at the system, moderator, and attendee during a presentation event set-up stage in accordance with an embodiment of the present invention.

Referring to FIG. 3A, a user who wishes to schedule a presentation, i.e., a moderator, initially accesses a web home page generated by the web front end 12. In other words, the web front end 12 is associated with an Internet Protocol (IP) address or domain name which the user accesses using a web browser.

Figure 4:
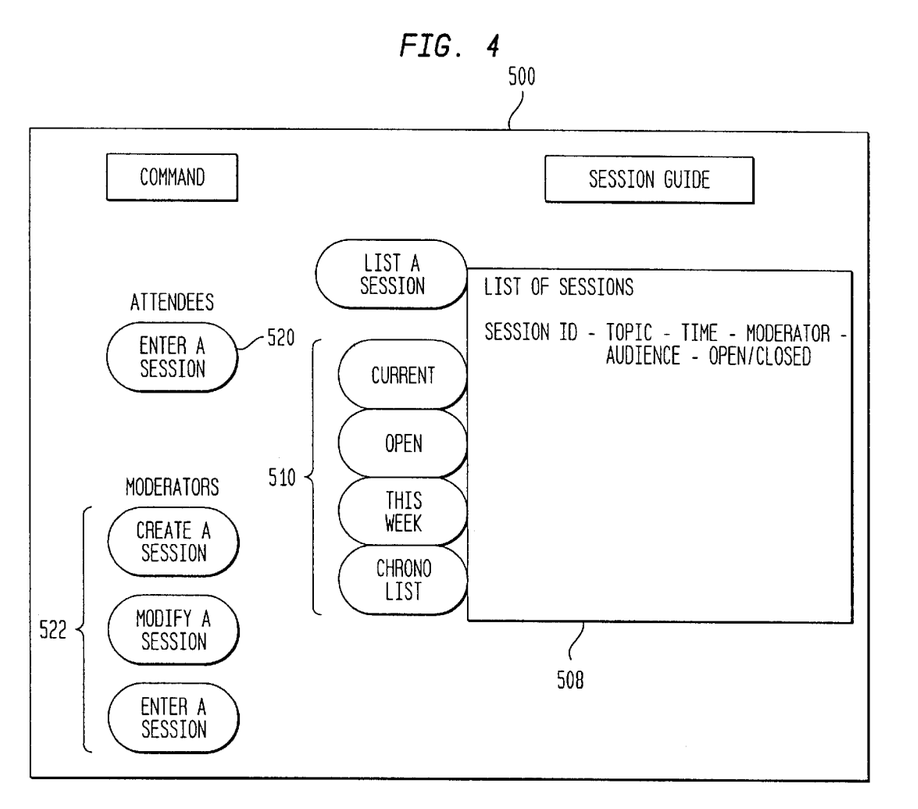
FIG. 4 illustrates an exemplary web home page generated by a front end of the media provider system in accordance with an embodiment of the present invention.

FIG. 4 illustrates an exemplary web home page 500 generated by the web front end 12. The web home page 500 includes a session information display area 508 which displays information relating to previously scheduled event sessions, e.g., indicating the session topic, time, moderator, audience, and whether the session is open to the public or closed, and further includes a number of GUIs which the user may select, e.g., using a mouse-driven pointer, to send commands back to the web front end 12. The user may interactively choose to view a list of current sessions, only sessions that are open to the public, sessions that are scheduled for the present week, or a chronological list of sessions by interactively selecting from a session list command section 510. The web home page 500 further includes a moderator command section 522 which allows a user to initiate a series of steps for scheduling, creating, modifying, or entering a presentation event. The web home page 500 further includes an attendee "enter a session" command 520 which allows a user to enter a scheduled event session.

When a user selects a "create an event session" command from the moderator control command section 522, the web front end 12 delivers a moderator scheduling screen to the user via the data network 40, which allows the user to interactively schedule an event session (step 302).

Figure 5:
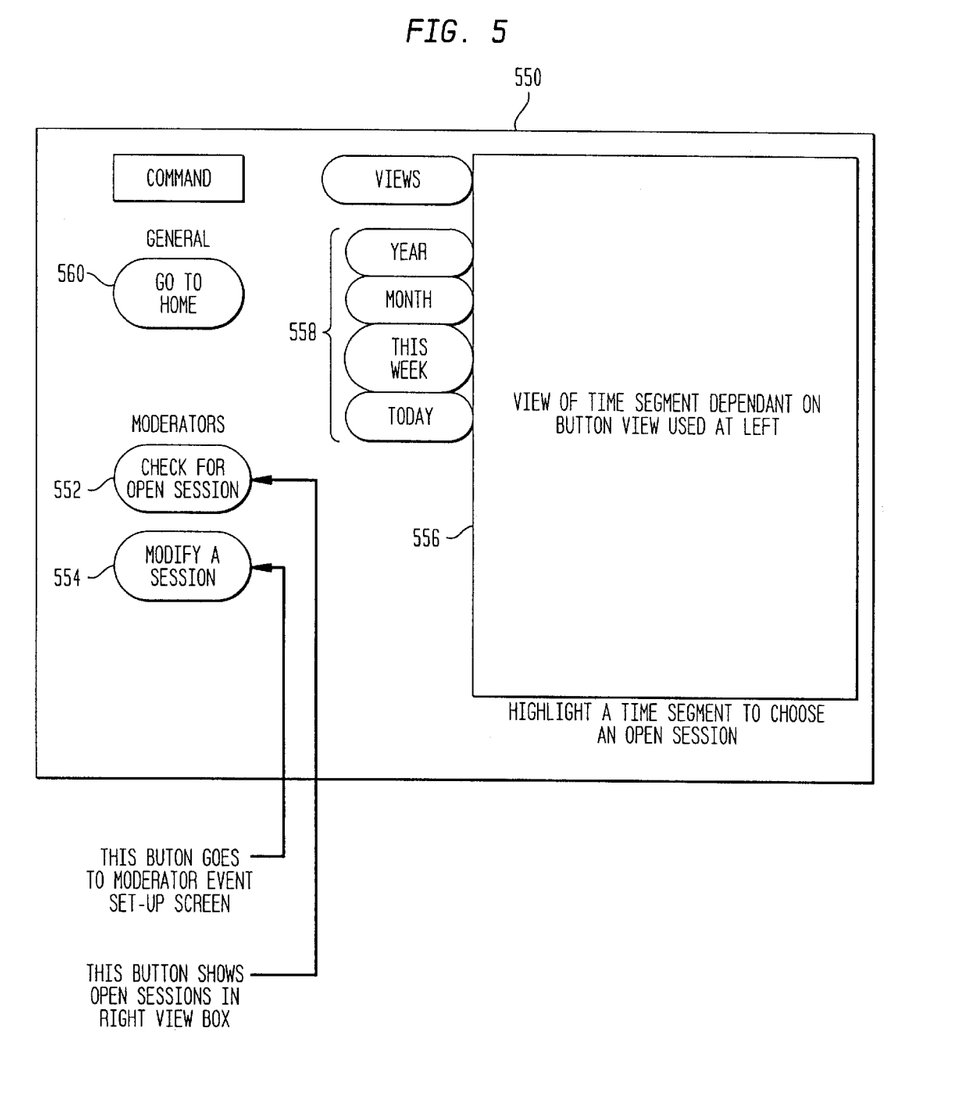
FIG. 5 illustrates an exemplary moderator scheduling screen generated by a front end of the media provider system in accordance with an embodiment of the present invention.

FIG. 5 illustrates an exemplary moderator scheduling screen 550 delivered by the web front end 12 when a user selects "create a session" command from the moderator command section 522 of the web home page 500. The moderator scheduling screen 550 includes a time segment display area 556 which displays available time-slots when the user selects a "check for open session" command 552. The moderator scheduling screen 550 further includes a time frame selecting section 558 in which the user selects the time frame for available time segments in the time segment display area 556, such as a day, week, month or year. The moderator scheduling screen 550 further includes a "go to home" command 560 which the user selects to return to the web home page 500. When the user selects a "modify session" command 554 and highlights an available time segment in the time segment display area 556, the web front end 12 delivers a moderator event set up screen used to input necessary information for scheduling and setting up a presentation event.

Figure 6:
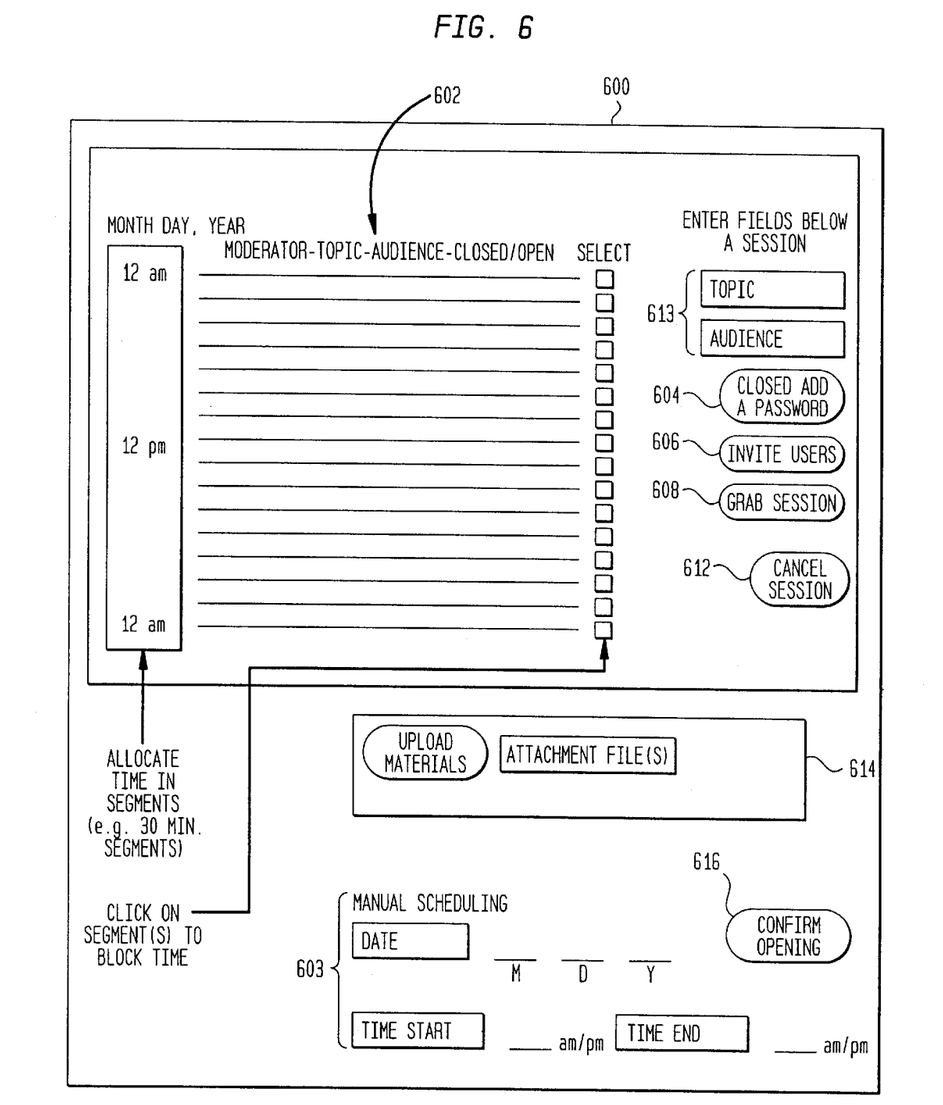
FIG. 6 illustrates an exemplary moderator event input screen generated by a front end of the media provider system in accordance with an embodiment of the present invention.

FIG. 6 illustrates an exemplary moderator event set-up screen 600, which includes a time selection section 602 in which the user selects one or a series of consecutive time slots for a presentation event, for example by clicking on an open box next to a displayed time segment which corresponds to a 30 minute slot. The moderator event set-up screen 600 further includes a manual scheduling input section 603 in which the user may enter a day, month, and year, and desired start/end times for a presentation event. The user may confirm that the manually input time slot is available by selecting a "confirm opening" command 616, which prompts the web front end 12 of the media provider system 10 to verify that the input time frame is available and reserve the selected time segment (step 304).

The user may restrict access and assign a password to a scheduled session by selecting a "closed, add a password" command 604, which causes the web front end 12 to prompt the user for a password to be assigned the presentation event (step 306). The user may also invite others to the scheduled section by selecting an "invite users" command 606 of the moderator event set-up screen 600, which prompts the web front end 12 to deliver an invite users screen (discussed below). The user enters topic and audience information in an event description input section 613. The user may further upload previously prepared materials to be sent to attendees during the presentation event, such as a slide presentation in "Microsoft PowerPoint," by inputting an attachment file(s) in an upload materials section 614 of the moderator event set-up screen 600 and selecting an "upload materials" command (step 312). The web front end 12 stores any uploaded materials for the scheduled presentation event in the data base 14(step 314).

After the user has entered all necessary information on the moderator event set-up screen 600, the user selects a "grab session" command 608 for transmitting entered information back to the web front end 12 of the media provider system 10. The user may also cancel the scheduled session by selecting a "cancel session" command 612 of the moderator event set-up screen 600.

Figure 7:
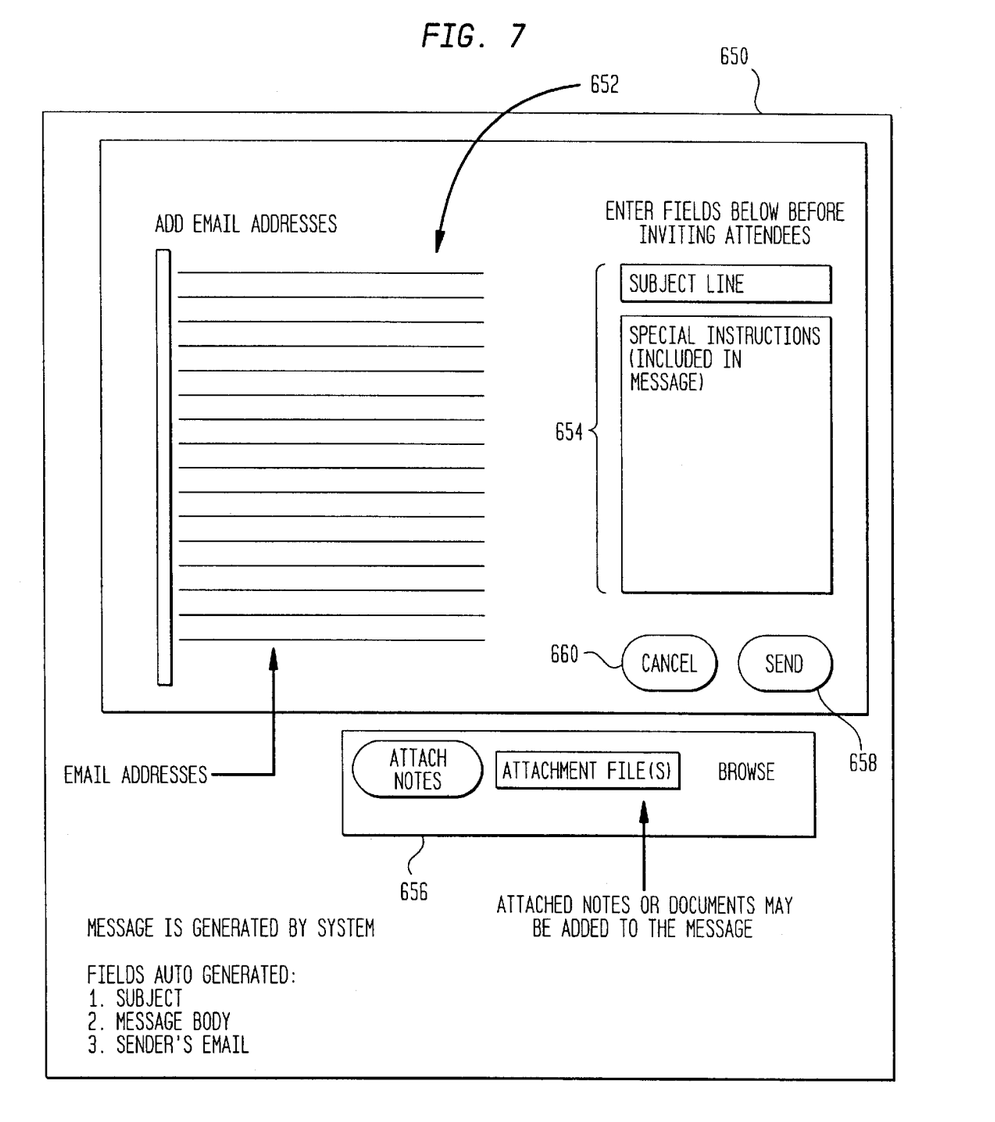
FIG. 7 illustrates an exemplary invite users screen generated by a front end of the media provider system in accordance with an embodiment of the present invention.

FIG. 7 illustrates an exemplary invite users screen 650 delivered by the web front end 12 when a user selects the "invite users" command 606 of the moderator event set-up screen 600. The invite users screen 650 includes an Email address input section 652 in which the user inputs Email addresses of people to be invited to the scheduled presentation event (step 307). The user may input a subject description and any additional message to be included in an attendee invite via a subject and special instructions input section 654 of the invite users screen 650. Furthermore, the user may attach notes or files, such as a document, to the attendee invite using an attachment input section 656, for example if the attendees should be familiar with certain documents before attending the presentation event. When complete, the moderator selects a "send" command 658, or selects a "cancel" command 660.

After the moderator selects the "send" command 658 of the invite users screen 650, the web front end 12 utilizes the previously entered information, including the Email addresses, subject description, special instructions, and attachment files, to generate and send Emails to the invited attendees (step 308a), and also notifies attendees of any access password if one has been assigned to the scheduled presentation event (step 308b). Therefore, the invited attendees entered by the user in the invite users screen 650 receive an Email notification with the information and attachments provided by the user (step 310a), and also receive an Email notification indicating an access password if one has been assigned (step 310b).

Figure 3B:
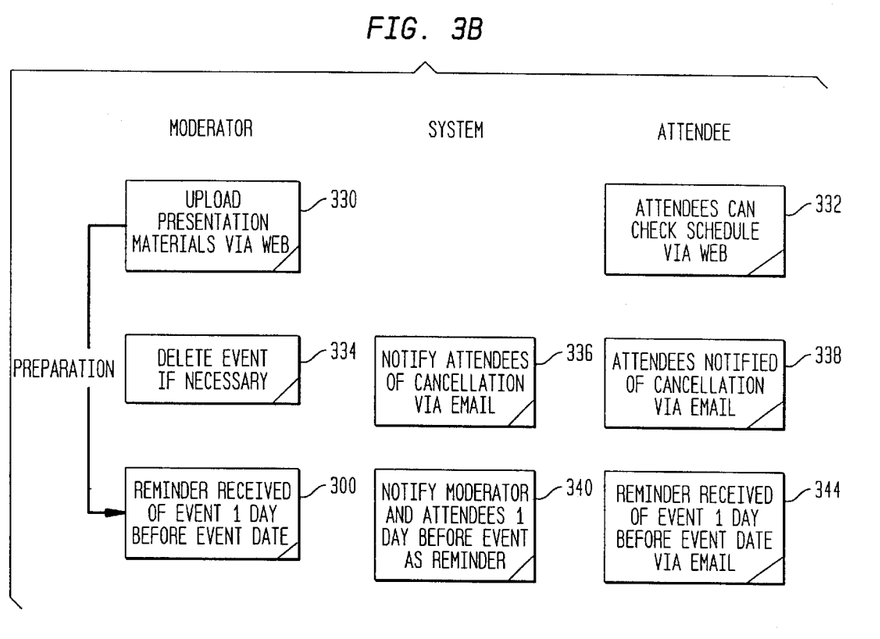
FIG. 3B is a flow diagram illustrating processing steps occurring at the system, moderator, and attendee during a presentation event preparation stage in accordance with an embodiment of the present invention.

Referring to FIG. 3B, illustrating preparation stage processing steps occurring at the media provider system 10, moderator 20, and attendees 30 according to an embodiment of the present invention, the moderator 20 may upload any additional pre-generated presentation materials for the scheduled event using the "upload materials" command 614 of the moderator event set-up screen 600 (step 330). Furthermore, attendees 30 may check the schedule of presentation events by accessing the web home page 500 delivered by the web front end 12 (step 332).

If the moderator 20 decides to cancel the scheduled presentation event, the moderator 20 accesses the moderator event set-up screen 600 to cancel the event (step 334). Upon cancellation, the web front end 12 transmits cancellation Email notifications (step 336) which are received by the attendees (step 338). If the event is not canceled, the web front end 12 transmits reminder Emails a short time, e.g., a day, before the event (step 340), which are received by the moderator 20 (step 342) and the attendees 30 (step 344).

Figure 3C:
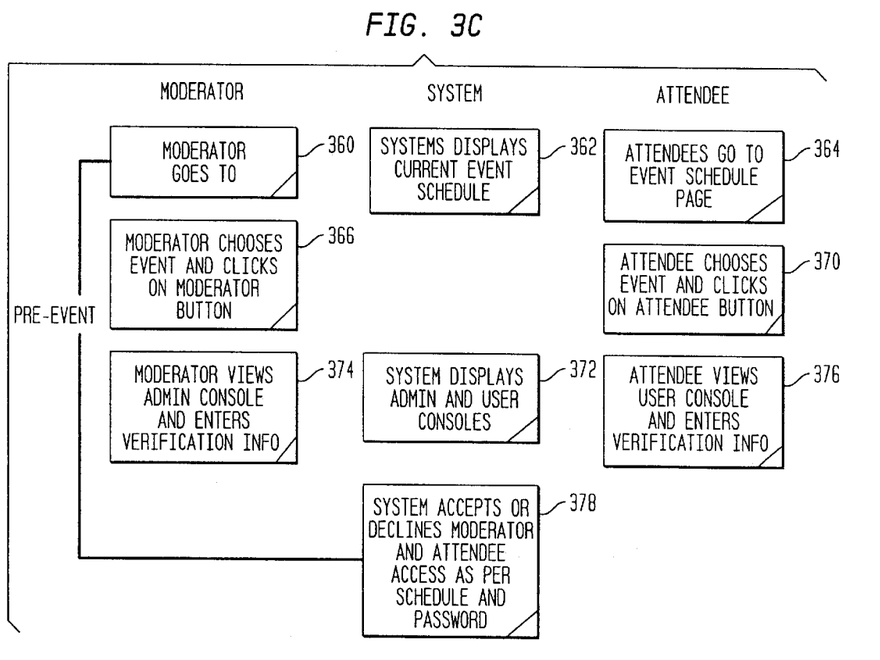
FIG. 3C is a flow diagram illustrating processing steps occurring at the system, moderator, and attendee during a pre-event stage in accordance with an embodiment of the present invention.

Referring to FIG. 3C, illustrating pre-event stage processing occurring at the system 10, the moderator 20, and the attendees 30, the web front end 12 generates an up-dated event schedule (step 362) which is accessed by the moderator (step 362) and the attendees (step 364) via the web home page 500. The moderator 20 selects the event to be moderated by clicking on an event listed in the session list display section 508, and chooses an "enter a session" command in the moderator command section 522 (step 366). Similarly, attendees 30 choose the appropriate event from the session list display section 508, and choose an "enter a session" command 520 (step 370).

When a moderator selects the "enter a session" command in the moderator command section 522, the web front end 12 delivers an administration console screen (step 372) which is displayed at the moderator computer terminal 22 (step 374). Similarly, when an attendee selects the "enter a session" command 520, the web front end 12 delivers a user console screen which is displayed at the attendee computer terminal 32 (step 376).

Figure 8A:
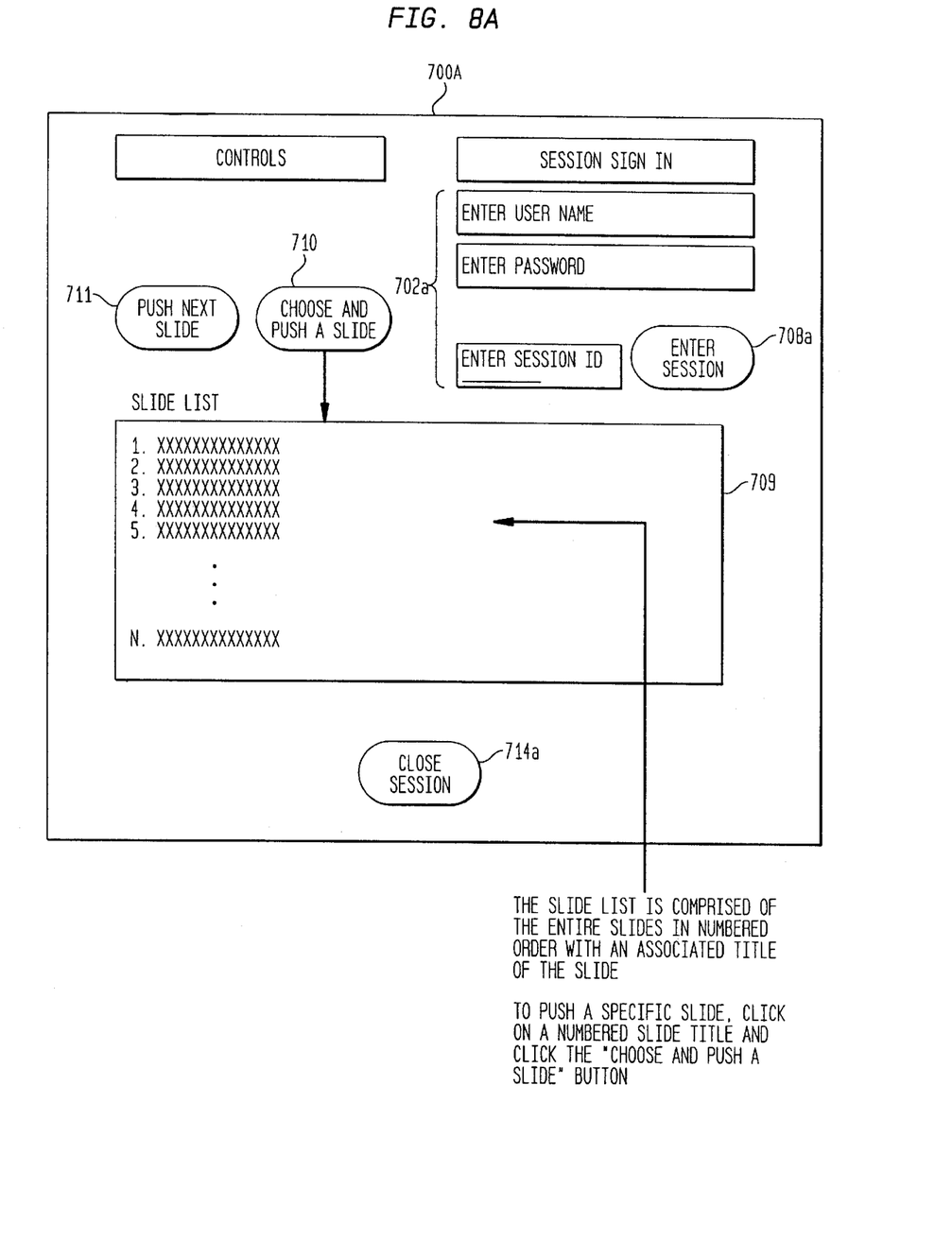
FIG. 8A illustrates an exemplary administration console screen generated by a front end of the media provider system in accordance with an embodiment of the present invention.

FIG. 8A illustrates an exemplary administration console screen 700A delivered to the moderator computer terminal 22. The administration console includes a session sign-in section 702a, in which the moderator inputs verification information, such as user name, password, and a session identification, and selects an "enter session" command 708a to receive authorization from the web front end 12 to control the event session. The web front end 12 of the media provider system 10 either accepts or denies moderator access in accordance with the information entered in the session sign-in section 702a and the event schedule (step 378).

Figure 8B:
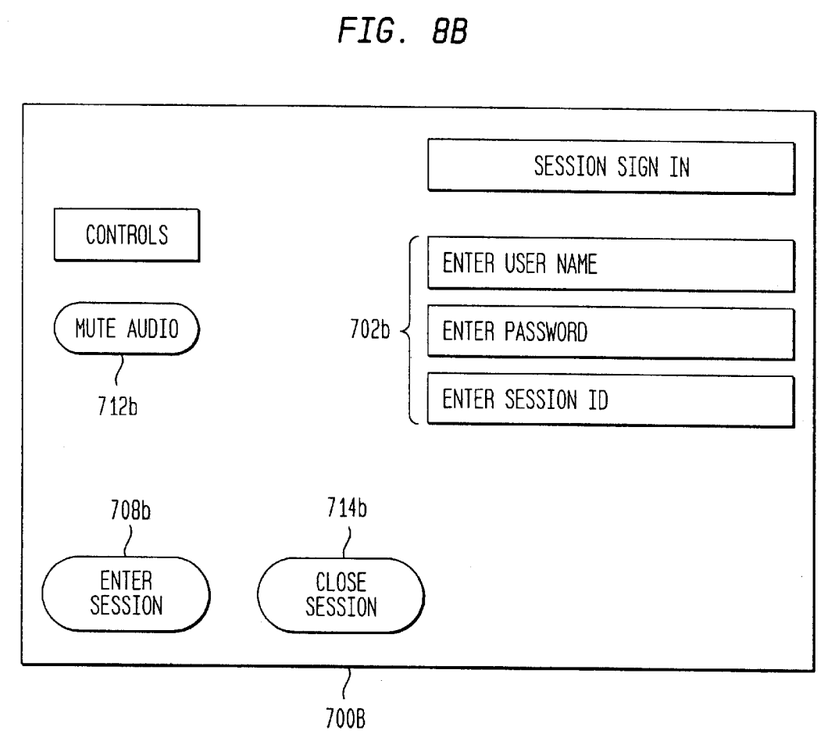
FIG. 8B illustrates an exemplary user console screen generated by a front end of the media provider system in accordance with an embodiment of the present invention.

FIG. 8B illustrates an exemplary user console screen 700B delivered to an attendee computer terminal 32. The user console 700B also includes a session sign in section 702b, in which the attendee 30 inputs verification information, such as user name, password (if closed access), and session ID, and selects an "enter session" command 708b to receive access authorization to the session. The web front end 12 either grants or denies the attendees 30 access to the presentation page based on the scheduled event time and information entered in the session sign-in section 702b (step 378).

After the web front end 12 grants access to the moderator 20, the moderator is enabled to utilize the administration console screen 700A to control the presentation. For the example illustrated in FIG. 8A, the administration console screen 700A includes a presentation materials display area 709 which lists the previously uploaded presentation materials, in this example a list of up-loaded slides, which the moderator 20 may select and enter a "choose and push a slide" command 710, which prompts the web front end 12 to push the selected slide to the attendees 30. Also, the moderator 20 may control a slide presentation using a "push next slide" command 711.

Figure 3D:
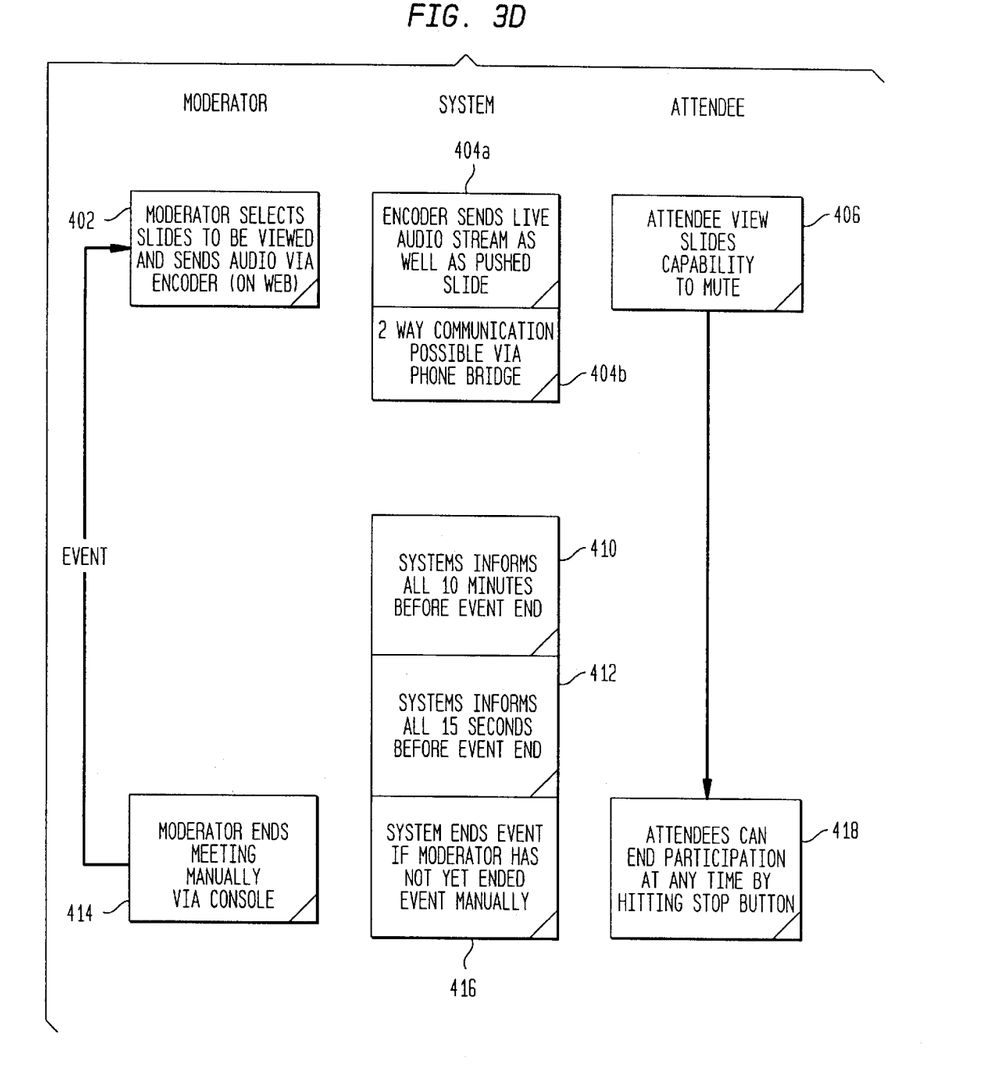
FIG. 3D is a flow diagram illustrating processing steps occurring at the system, moderator, and attendee during an event stage in accordance with an embodiment of the present invention.

Referring to FIG. 3D, illustrating event stage processing steps occurring at the system 10, the moderator 20, and the attendees 30, the moderator 20 initiates the presentation by selecting slides to be viewed by the attendees 30 using a "push next slide" command 711 or the "choose and push a slide" command 710 of the administration console 700A, and then controls the flow of the presentation by selecting additional slides to be viewed by the attendees 30 (step 402). The moderator computer terminal 22 may also send digital audio data (e.g., input using a microphone peripheral) to the media provider system 10 via the data network 40 (step 402). The web front end 12 receives the digital audio from the data network 40, outputs the digital audio data to the steaming encoder 16 which encodes the audio data, e.g. using known compression techniques such as linear predictive encoding, and outputs the encoded audio to the streaming server 18. The streaming server 18 streams the encoded audio, e.g., in "RealAudio" format, for output to attendees 30 via the web front end 12. Therefore, the media provider system 10 streams and transmits encoded audio to the attendees 30, and further "pushes" the selected slides which correspond to the encoded audio (step 404a). Thus, the attendees 30 view the "pushed" slides, and reproduce the corresponding audio stream (step 406). Attendees may also choose to only view the slides without reproducing the corresponding audio by selecting a "mute audio" command 712b of the user console screen 700B.

The moderator 20 may manually end the presentation event via the administration console screen 700A by selecting a "close session" command 714a (step 414). Also, the attendees 30 can terminate their participation at any time by selecting a "close session" command 714b of the user console 700B (step 418).

Assuming the moderator 20 has not previously terminated the presentation event, the web front end 12 sends messages to the moderator 10 and attendees 20 indicating the time left in the presentation. For example, the web front end 12 may send a message ten minutes before the event is to end (step 410), and fifteen seconds before the event is to end (step 412). Furthermore, the web front end 12 ends the event if not previously terminated by the moderator 20 when the allotted time-slot for the presentation has expired (step 416).

As an alternative to sending audio from the moderator 20 to the attendees via the media provider system 10 and the data network 40, a simplified embodiment of the present invention may be achieved in which the moderator telephone 24 and the attendee telephones 34-1, . . . , 34-i establish a conference call connection via the phone bridge network 50 to enable two-way audio communication during the scheduled presentation event.

As described above, the present invention solves the problems of manually produced presentations by automating scheduling and event production so that any user can use the system 24 hours a day, seven days a week. The programming for the live multicasting/broadcasting channel is created by the participants, such as business managers, who wish to communicate, train, or present to an audience, thus essentially providing an "open mike" forum for programming.

It should be apparent to those skilled in the art that various modifications and applications of this invention are contemplated which may be realized without departing from the spirit and scope of the present invention.

What is claimed is:

1. A computer-implemented method for administrating computer network-based presentation events comprising:

receiving a request to reserve a time slot for a presentation event;

determining availability of the requested time slot and reserving the requested time slot if available;

receiving information regarding the presentation event;

receiving presentation commands during the reserved time slot to control the presentation event; and outputting presentation materials in response to received presentation commands.

2. The method of claim 1, further comprising:

receiving a list of attendees for a scheduled presentation event; and sending Email notifications regarding the scheduled presentation event.

3. The method of claim 2, wherein said Email notification includes a password for admission to the scheduled presentation event.

4. The method of claim 1, wherein access to the scheduled presentation event is open.

5. The method of claim 1, further comprising:

uploading presentation materials during an event set-up stage; and linking the uploaded materials to the scheduled presentation event.

6. The method of claim 1, further comprising:

receiving digital audio data via a data network;

streaming said digital audio data; and outputting streamed audio during the scheduled presentation event.

7. The method of claim 1, further comprising:

receiving digital video data via a data network;

streaming said digital video data; and outputting streamed video during the scheduled presentation event.

8. The method of claim 1, further comprising;

generating a web page displaying a list of previously scheduled presentation events.

9. The method of claim 5, wherein said uploaded presentation materials include a series of digital slides.

10. The method of claim 6, wherein said data network is the Internet.

11. The method of claim 6, wherein said data network is an intranet.

12. The method of claim 2, further comprising:

sending Email reminders shortly before the scheduled presentation event is to commence.

13. The method of claim 1, further comprising:

generating an administration console screen for receiving presentation commands via a data network.

14. The method of claim 1, further comprising:

terminating the scheduled presentation event after a time period has expired.

15. A computer-based system for administrating computer network based presentation events comprising:

request input means for receiving a request to reserve a time slot for a presentation event;

scheduling means for determining availability of the requested time slot and reserving the requested time slot if available;

presentation data input means for receiving information regarding the presentation event;

command input means for receiving presentation commands during the reserved time slot to control the presentation event; and output means for outputting presentation materials in response to received presentation commands.

16. The system of claim 15, further comprising:

attendee input means for receiving a list of attendees for a scheduled presentation event; and notifying means for sending Email notifications regarding the scheduled presentation event.

17. The system of claim 16, wherein said Email notifications include a password for admission to the scheduled presentation event.

18. The system of claim 15, wherein access to the scheduled presentation event is open.

19. The system of claim 15, further comprising:

uploading means for uploading presentation materials during an event set-up stage; and associating means for associating the uploaded materials to the scheduled presentation event.

20. The system of claim 15, further comprising:

audio input means for receiving digital audio data via a data network;

audio streaming means for streaming said digital audio data; and audio output means for outputting streamed audio during the scheduled presentation event.

21. The system of claim 15, further comprising:

video input means for receiving digital video data via a data network;

video streaming means for streaming said digital video data; and video output means for outputting streamed video during the scheduled presentation event.

22. The system of claim 15, further comprising;

web server means for generating a web page displaying a list of previously scheduled presentation events.

23. The system of claim 19, wherein said uploaded presentation materials include a series of digital slides.

24. The system of claim 20, wherein said data network is the Internet.

25. The system of claim 20, wherein said data network is an intranet.

26. The system of claim 16, wherein said notifying means further sends Email reminders shortly before the scheduled presentation event is to commence.

27. The system of claim 15, further comprising:

web server means for generating an administration console screen for receiving presentation commands via a data network.

28. The system of claim 15, further comprising:

termination means for terminating the scheduled presentation event after a time period has expired.

29. A computer-readable storage medium storing program code for administrating computer network-based presentation events, wherein, when the program code is executed by a computer, the computer implements the steps of:

receiving a request to reserve a time slot for a presentation event;

determining availability of the requested time slot and reserving the requested time slot if available;

receiving information regarding the presentation event;

receiving presentation commands during the reserved time slot to control the presentation event; and outputting presentation materials in response to received presentation commands.

* * * * *